United States Patent [19]

Kadkade

[11] Patent Number: 4,788,793

[45] Date of Patent: Dec. 6, 1988

[54] METHOD OF INHIBITING PREMATURE BUDDING OF SHORT-DAY FLORAL CROPS

[75] Inventor: Prakash G. Kadkade, Marlboro, Mass.

[73] Assignee: GTE Laboratories Incorporated, Waltham, Mass.

[21] Appl. No.: 472,449

[22] Filed: Mar. 7, 1983

[51] Int. Cl.⁴ .............................................. A01G 1/00
[52] U.S. Cl. .................................... 47/58; 47/DIG. 6
[58] Field of Search .............................. 47/58, DIG. 6

[56] References Cited

U.S. PATENT DOCUMENTS 4,109,414  8/1978  Kadkade ........................ 47/DIG. 6

FOREIGN PATENT DOCUMENTS 2481883  11/1981  France ........................... 47/DIG. 6

OTHER PUBLICATIONS

Photoperiodism in Plants by H. A. Borthwick & S. B. Hendricks.
Role of Phytochrome in Control of Flowering of Chrysanthemum by H. A. Bothwick and H. M. Cathey.
Photoperiodic Control of Flowering by H. A. Bothwitk.
Failure of Reversibility of the Photoreaction Controlling Plant Growth by H. A. Bothwick et al.

Primary Examiner—Robert A. Hafer
Attorney, Agent, or Firm—Fred Fisher

[57] ABSTRACT

A method of inhibiting premature budding and subsequent flowering of a floral crop selected from the group of chrysanthemum and poinsettia during the season in which the daily photoperiod does not exceed ten hours comprises the step of illuminating the crop, generally six hours after the onset of a night period, with a fifteen minute illumination of a narrowband red light having a predominant emission peak centered around 660 nm having an intensity in the range of 1 $\mu W/cm^2$ to 50 $\mu W/cm^2$.

3 Claims, No Drawings

METHOD OF INHIBITING PREMATURE BUDDING OF SHORT-DAY FLORAL CROPS

BACKGROUND OF THE INVENTION

1. Field of the Invention

This invention relates to a new and improved method of inhibiting premature budding of a short-day floral crop and, in particular, to a new and improved method of inhibiting premature budding and subsequent flowering of such a crop. Accordingly, it is a general object of this invention to provide new and improved methods of such character.

2. Description of the Prior Art

Commercially, chrysanthemums and other short-day flowering crops are prevented from flowering during short days by the use of low intensity (40 $\mu$W/cm$^2$–80 $\mu$W/cm$^2$) incandescent light given as night-interruption for four hours. Some growers have also used cyclical lighting for five minutes every half hour through the fifteen hour dark period as an energy conservartion measure.

As reported by Elwood D. Bickford and Stuart Dunn in "Lighting for Plant Growth", 1972, long day responses for both short-day and long-day plants are usually accomplished by continuous lighting for a period of four to eight hours before sunrise or after sunset (photoperiod extension), continuous lighting for a two to five hour period in the middle of the dark period ("night break"), or interrupted lighting for a two to five hour period in the middle (10 p.m. to 2 a.m.) of the dark period (cyclic- or flash-lighting). In the latter method of lighting, incandescent lamps are cycled, or flashed, on for 2 to 7% of a time period, i.e., one to four seconds during each minute or one to four minutes each hour, etc.

The premature flower buds formation in chrysanthemum cultivars is a total loss to the grower. Present commercial approaches for inhibiting flower bud initiation require long exposure to night-lighting with incandescent lights, and therefore, are energy consuming and economically unfeasible. Some commercial growers of field chrysanthemums use one hundred 150 watts reflectorized incandescent lamps per acre which are turned on 2½ to 3 hours per night, depending on the season (longer during the winter months). The lights are used every night from mid-August to mid-March for control of harvest time (achieved by flower inhibition). The energy expense is considerable. When the lights are on, the plants do not flower; the grower can turn out the lights in selected areas for flowering to occur on "cue". As a result, flowers can be picked for the Eastern U.S. cut flower industry on a timely and controlled schedule from August to March. However, the cyclical lighting approach that has been used commercially has generally been abandoned by growers due to timing clock failures and the like.

SUMMARY OF THE INVENTION

Another object of this invention to provide a new and improved method of inhibiting the premature budding and subsequent flowering of a short-day floral crop during the winter months without causing any adverse effect on the plant growth and development.

Yet another object of this invention is to provide a new and improved method of inhibiting the premature budding and subsequent flowering of a short-day floral crop during the winter months while simultaneously preventing insect damage thereto.

In accordance with one aspect of the invention, a method of inhibiting premature budding and subsequent flowering of a short-day floral crop includes a step of illuminating the crop using brief, low intensity night-break treatment near the middle of each long night period with narrowband red light having a peak emission centered around 660 nm. In accordance with certain features of the invention, the floral crop can be selected from the group consisting of chrysanthemum and poinsettia. The brief treatment can be for a duration of up to fifteen minutes. The light can be a narrowband red light with a peak emission around 660 nm. The night-break treatment can be initiated generally six hours after the onset of a night period. The term "short-day" can include the winter season having daily photoperiods of ten hours or less. The intensity illumination can be in a range of 1 $\mu$W/cm$^2$ to 50 $\mu$W/cm$^2$.

In accordance with another aspect of the invention, a method of inhibiting premature budding and subsequent flowering of a floral crop, such as chrysanthemum and poinsettia, during a season when the daily photoperiod does not exceed ten hours, includes the step of illuminating the crop (generally six hours after the onset of the night period) with fifteen minutes illumination of a narrowband light having a predominant red light wavelength with a peak emission centered around 660 nm with an intensity in the range of 1 $\mu$W/cm$^2$ to 50 $\mu$W/cm$^2$.

DESCRIPTION OF PREFERRED EMBODIMENT

Chrysanthemum and poinsettia plants were exposed to night break treatment with a 660 nm light source. The 660 nm light source can include fluorescent and/or HID (high intensity discharge) lithium filled metal halide. The intensity range can be 1 $\mu$W/cm$^2$–50 $\mu$W/cm$^2$.

Preferably, the red light source is a narrowband emitting fluorescent lamp with peak emission centered around 660 nm (such as Phosphor F-236, GTE), from which light below 600 nm is absorbed by an appropriate plastic or polycarbonate filter. The filtered spectral output from the light source is shown in the following table:

| λ | OUTPUT WATTS | PERCENT OUTPUT WATTS OF TOTAL LAMP OUTPUT | |
|---|---|---|---|
| 380–500 nm | — | | |
| 500–600 nm | <0.03 | 0.04 | |
| 600–620 nm | 0.94 | 1.30 | Red region of the light spectrum with lamp watt output equal to about 97.26 percent. |
| 620–640 nm | 11.14 | 15.46 | |
| 640–660 nm | 27.61 | 38.32 | |
| 660–680 nm | 26.55 | 36.85 | |
| 680–700 nm | 3.84 | 5.33 | |
| 700–720 nm | 1.11 | 1.54 | |
| 720–740 nm | 0.39 | 0.541 | |
| 740–760 nm | 0.23 | 0.319 | |
| 760–780 nm | 0.19 | 0.264 | |
| 780–800 nm | 0.024 | 0.033 | |
| TOTAL | 72.05 | 99.997 | |

The light was applied for fifteen minutes near the middle of each long dark period (generally six hours after the onset of the dark period) during the winter months in which there is a daily photoperiod of ten hours or less.

Night-break treatment with 660 nm light (50 $\mu$W/cm$^2$ for 15 minutes) was effective in preventing bud formation in the following chrysanthemum varieties:

| 1. Albatross | 13. Accent |
|---|---|
| 2. Average Pink | 14. Chips |
| 3. Yellow Polaris | 15. Dramatic |
| 4. May Shoesmith | 16. Inferno |
| 5. White Buttons | 17. Horizon |
| 6. Mount Peak | 18. Blaze |
| 7. Florida Marble | 19. Dignity |
| 8. Flame Belair | 20. Neptune |
| 9. Blue Marble | 21. Liberty |
| 10. White Marble | 22. Fiesta |
| 11. Iceberg | 23. Mandarin |
| 12. Polaris | 24. Orange Bowl |

Night-break treatment with 660 nm light (50 $\mu W/cm^2$ for 15 minutes) was effective in preventing bud formation in the following poinsettia varieties:
1. Jingle Bells
2. V-8
3. V-14
4. Hot-Pink
5. Annette Hegg The results indicate a complete inhibition of flowering in ten different cultures of chrysanthemum and poinsettia.

Fifteen minutes of 660 nm light (1 $\mu W/cm^2$–50 $\mu W/cm^2$) per night was as effective as the 180 minutes of cool white light and 240 minutes of incandescent light which are used commercially for inhibiting flowering.

The application of low-intensity red light night-break exposure with peak emission centered around 660 nm for short period to inhibit flowering of short-day crops during the winter months advantageously can prevent waste of electrical energy and reduce cost to commercial growers and prevent or minimize insect damage to crops.

In accordance with experimental data, 22 watt fluorescent lamps were used in lieu of the commercial 150 watt lamps. Approximately fifty lamps or less were used per acre, as contrasted with one hundred 150 watt lamps of the prior art. The 22 watt lamps, in accordance with this invention, are used only up to ¾ hour per night (preferably, one-quater hour) in contrast to two and one-half hours per night for the incandescent lamps of the prior art. See table below:

|  | Known prior practice | New Practice: |
|---|---|---|
| No. of Lamps | 100 150 W incandescent/ acre | 50 (or less) 22 W fluorescent lamps/acre |
| Date lamps are used | Mid-August to Mid-March | Mid-August to Mid-March |
| Hours use, daily | 2½ to 3 hours/ night | Up to ¾ hour (preferably, one-quarter hour) |
| Insect Attraction | Attraction, by sheer intensity, requiring insect management practices. | Zero attraction with a system involving lamps and filters. Insecticides applications are not required. |

More than 50% of the energy can be conserved with considerable savings for the grower. Hence, the system is energy efficient.

The results of illuminating a short-day floral crop with brief, low intensity night-break treatment with 660 nm light will be apparent from the data shown in the following chart:

| EFFECT OF NIGHT-BREAK LIGHT TREATMENT ON CERTAIN GROWTH CHARACTERISTICS OF CHRYSANTHEMUMS (VAR. "ALBATROSS")* | | | | |
|---|---|---|---|---|
| TREATMENT | NO. OF FLOWERS/ PLANT | HEIGHT (cm) | NO. OF NODES | NO. OF SIDE BRANCHES |
| Control | 28.56 ± 1.87 | 36.78 ± 1.02 | 25.73 ± 0.61 | 3.56 ± 0.245 |
| 1–50 $\mu W/cm^2$ (660 nm: 15 minutes) | None | 67.03 ± 4.13 | 38.21 ± 1.8 | 3.05 ± 0.096 |
| 30–80 $\mu W/cm^2$ (Cool White: 180 minutes) | None | 72.89 ± 3.7 | 44.86 ± 1.4 | 2.87 ± 0.117 |

*As of 120 days after the start of night-break light treatment.

Premature budding and subsequent flowering of short-day floral crops (such as chrysanthemum and poinsettia) can be inhibited during the winter months using brief, low intensity red light night-break treatment with peak emission centered around 660 nm without causing any adverse effect on plant growth and development and without encouraging insect damage to crops.

What is claimed is:

1. A method of inhibiting premature budding and subsequent flowering of a short-day floral crop selected from the group consisting of chrysanthemum and poinsettia comprising the step of illuminating the crop using single, continuous, brief, low intensity night-break treatment for a duration of up to fifteen minutes, near the middle of each long night period, with narrowband red light having a peak emission centered around 660 nm, said night-break treatment being initiated generally six hours after the onset of a night period.

2. A method of inhibiting premature budding and subsequent flowering of a floral crop selected from the group of chrysanthemum and poinsettia during the season in which the daily photoperiod does not exceed ten hours comprising the step of illuminating the crop, generally six hours after the onset of a night period, with an uninterrupted fifteen minute illumination of a narrowband red light having a predominant emission peak centered around 660 nm having an intensity in the range of 1 $\mu W/cm^2$ to 50 $\mu W/cm^2$.

3. The method as recited in claim 2 wherein insect damage to said crop is discouraged.

* * * * *